(12) United States Patent
Hasegawa

(10) Patent No.: US 11,534,844 B2
(45) Date of Patent: Dec. 27, 2022

(54) WIRE ELECTRICAL DISCHARGE MACHINE AND ELECTRICAL DISCHARGE MACHINING METHOD

(71) Applicant: FANUC CORPORATION, Yamanashi (JP)

(72) Inventor: Yasuo Hasegawa, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 436 days.

(21) Appl. No.: 16/655,641

(22) Filed: Oct. 17, 2019

(65) Prior Publication Data
US 2020/0122252 A1 Apr. 23, 2020

(30) Foreign Application Priority Data
Oct. 23, 2018 (JP) .............................. JP2018-199279

(51) Int. Cl.
  *B23H 1/02* (2006.01)
  *B23H 7/04* (2006.01)
  *B23H 7/08* (2006.01)
  *B23H 7/18* (2006.01)

(52) U.S. Cl.
  CPC ............. *B23H 1/024* (2013.01); *B23H 1/022* (2013.01); *B23H 7/04* (2013.01); *B23H 7/08* (2013.01); *B23H 7/18* (2013.01)

(58) Field of Classification Search
  CPC ........... B23H 1/024; B23H 1/022; B23H 7/04
  See application file for complete search history.

(56) References Cited

U.S. PATENT DOCUMENTS

| 2004/0124189 A1 | 7/2004 | Murai et al. |
| 2010/0294743 A1 | 11/2010 | Hashimoto et al. |
| 2010/0308017 A1 | 12/2010 | Hashimoto et al. |
| 2013/0193112 A1* | 8/2013 | Murai ..................... B23H 7/04 219/69.12 |

(Continued)

FOREIGN PATENT DOCUMENTS

| CN | 102101207 A | 6/2011 |
| CN | 102380677 A | 3/2012 |
| JP | 2016196078 A | 11/2016 |

OTHER PUBLICATIONS

Extended European Search Report for European Patent Application No. 19203467.6, dated Apr. 1, 2020, 8 pgs.

(Continued)

*Primary Examiner* — Geoffrey S Evans
(74) *Attorney, Agent, or Firm* — Fredrikson & Byron, P.A.

(57) ABSTRACT

A wire electrical discharge machine includes: a gap voltage detector for detecting a voltage across an electrode gap; a first voltage control unit for applying a first voltage to the electrode gap; a discharge determiner for determining whether or not the electrode gap is in a discharging state during application of the first voltage; and a second voltage control unit for supplying a machining current through the electrode gap when the electrode gap is in a discharging state. After a supply of the machining current to the electrode gap, even when a discharge is induced by the next application of the first voltage to the electrode gap, the second voltage control unit prohibits application of a second voltage to the electrode gap.

4 Claims, 4 Drawing Sheets

(56) References Cited

U.S. PATENT DOCUMENTS

| | | | |
|---|---|---|---|
| 2015/0217390 A1* | 8/2015 | Sasaki | B23H 1/02 219/69.13 |
| 2015/0246403 A1* | 9/2015 | Yamada | B23H 7/14 219/69.12 |
| 2015/0283634 A1 | 10/2015 | Kim et al. | |
| 2018/0056421 A1* | 3/2018 | Furuta | B23H 7/04 |

OTHER PUBLICATIONS

English Abstract and Machine Translation for Japanese Publication No. 2016196078 A, published Nov. 24, 2016, 11 pgs.
English Abstract and Machine Translation for Chinese Publication No. CN102101207A, published Jun. 22, 2011, 5 pgs.
English Abstract and Machine Translation for Chinese Publication No. CN102380677A, published Mar. 21, 2012, 9 pgs.

* cited by examiner

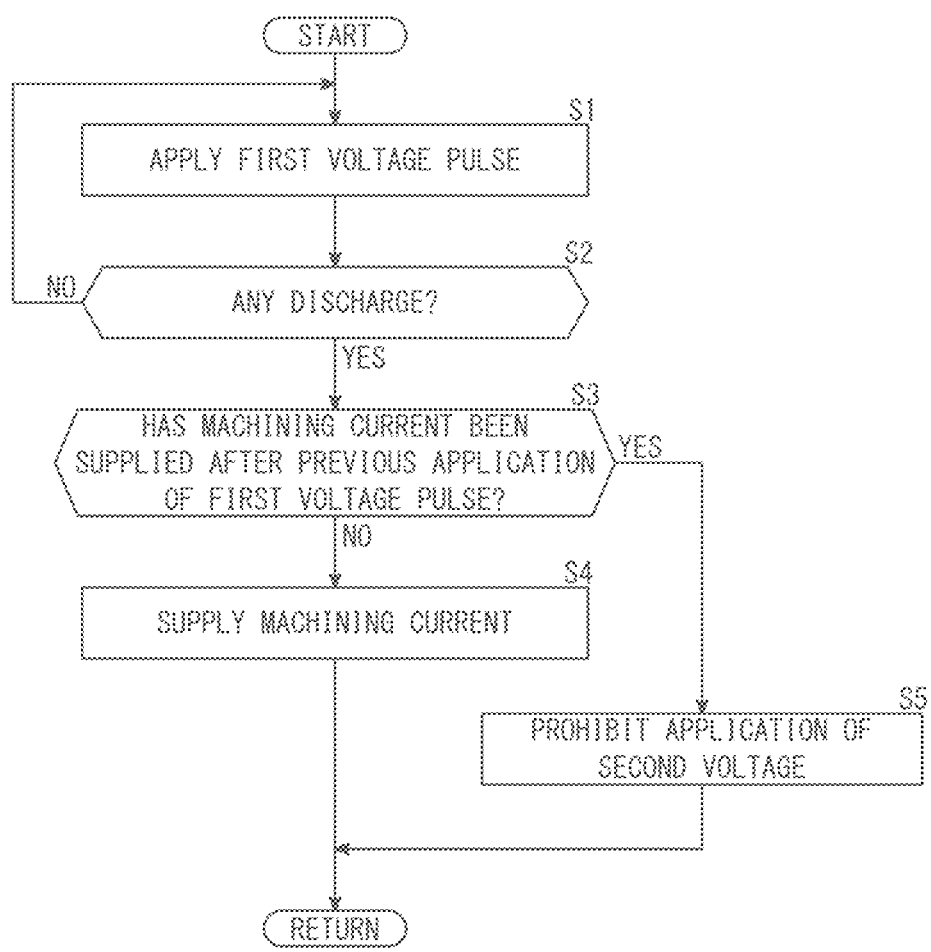

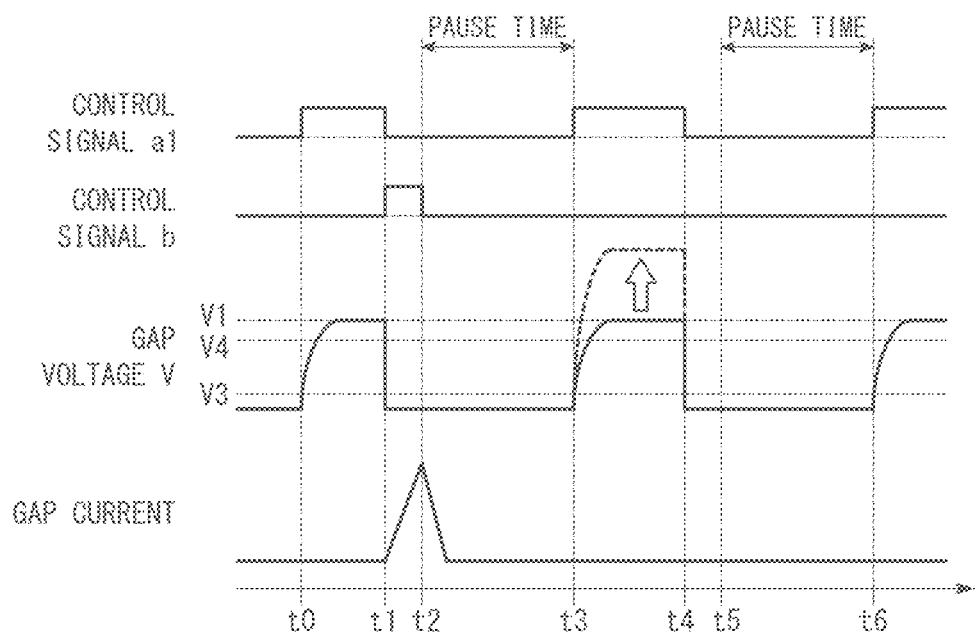
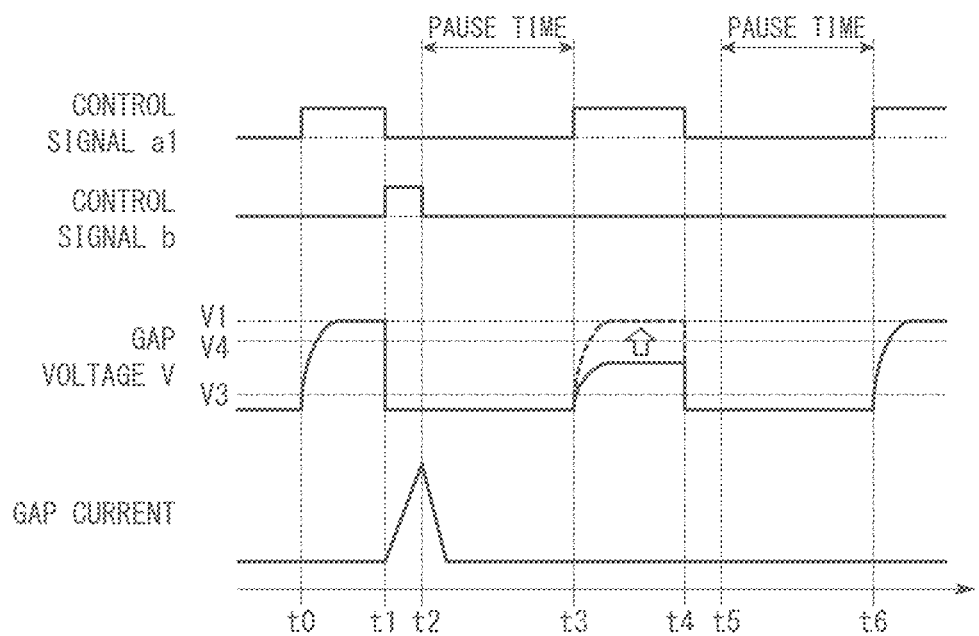

WIRE ELECTRICAL DISCHARGE MACHINE AND ELECTRICAL DISCHARGE MACHINING METHOD

CROSS-REFERENCE TO RELATED APPLICATION

This application is based upon and claims the benefit of priority from Japanese Patent Application No. 2018-199279 filed on Oct. 23, 2018, the contents of which are incorporated herein by reference.

BACKGROUND OF THE INVENTION

Field of the Invention

The present invention relates to a wire electrical discharge machine and an electrical discharge machining method that perform electrical discharge machining on a workpiece by applying voltage across the electrode gap between a wire electrode and the workpiece to generate electrical discharge.

Description of the Related Art

As disclosed in Japanese Laid-Open Patent Publication No. 2016-196078, in the wire electrical discharge machining technology, a voltage (spark inducing voltage) for inducing electrical discharge is applied across the electrode gap between the wire electrode and the workpiece, and when a discharge is generated, a machining current (discharge current) is supplied between the electrodes to machine the workpiece.

SUMMARY OF THE INVENTION

However, when a capacitor is included in the power circuit that applies a spark inducing voltage between the electrodes, the capacitor sometimes may build up electric charge due to the supply of the machining current between the electrodes. The built up charge will cause gap voltage fluctuation, resulting in failure to perform appropriate machining.

It is therefore an object of the present invention to provide a wire electrical discharge machine and an electrical discharge machining method that prevent occurrence of a failure to perform desired machining due to fluctuation in the gap voltage caused by a capacitor.

A first aspect of the invention resides in a wire electrical discharge machine which performs electrical discharge machining on a workpiece by using electrical discharges generated by applying voltage across an electrode gap formed between a wire electrode and the workpiece, comprising: a first power circuit including a capacitor and configured to induce an electrical discharge by applying a first voltage across the electrode gap; a second power circuit configured to supply a machining current through the electrode gap by applying a second voltage across the electrode gap; a gap voltage detector configured to detect the voltage across the electrode gap; a first voltage control unit configured to apply the first voltage to the electrode gap in an intermittent manner by controlling the first power circuit; a discharge determiner configured to determine whether or not the electrode gap is in a discharging state during application of the first voltage, based on the detected voltage across the electrode gap; and a second voltage control unit configured to supply the machining current through the electrode gap by controlling the second power circuit when the electrode gap is determined to be in a discharging state, wherein after a supply of the machining current to the electrode gap, even when a discharge is induced during next application of the first voltage to the electrode gap, the second voltage control unit prohibits the second power circuit from applying the second voltage to the electrode gap so as not to supply the machining current through the electrode gap.

A second aspect of the present invention resides in an electrical discharging method for performing electrical discharge machining on a workpiece with a wire electrical discharge machine by using electrical discharges generated by applying voltage across an electrode gap formed between a wire electrode and the workpiece, wherein the wire electrical discharge machine includes: a first power circuit including a capacitor and applying a first voltage across the electrode gap to induce an electrical discharge; a second power circuit applying a second voltage across the electrode gap to supply a machining current through the electrode gap; and a gap voltage detector detecting the voltage across the electrode gap, the electrical discharging method comprising: a first voltage control step of applying the first voltage to the electrode gap in an intermittent manner by controlling the first power circuit; a discharge determination step of determining whether or not the electrode gap is in a discharging state during application of the first voltage, based on the detected voltage across the electrode gap; and a second voltage control step of supplying the machining current through the electrode gap by controlling the second power circuit when the electrode gap is determined to be in a discharging state, wherein after a supply of the machining current to the electrode gap, even when a discharge is induced during next application of the first voltage to the electrode gap, the second power circuit is prohibited from applying the second voltage to the electrode gap in the second voltage control step so as not to supply the machining current through the electrode gap.

According to the present invention, it is possible to prevent occurrence of failures to perform proper machining due to fluctuation of the gap voltage due to a capacitor.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a flowchart illustrating an operation of a wire electrical discharge machine applying voltage across the electrode gap according to the present embodiment;

FIG. 4A is a timing chart showing an example of application timings of a first voltage and a second voltage applied to the electrode gap and the behavior of the voltage across an electrode gap in a wire electrical discharge machine according to the present embodiment; and FIG. 4B is a timing chart showing another example of application timings of a first voltage and a second voltage applied to the electrode gap and the behavior of the voltage across an electrode gap in a wire electrical discharge machine according to the present embodiment.

DESCRIPTION OF THE PREFERRED EMBODIMENTS

A wire electrical discharge machine and an electrical discharge machining method according to the present invention will be detailed below by describing a preferred embodiment with reference to the accompanying drawings.

EMBODIMENT

Figure 1:
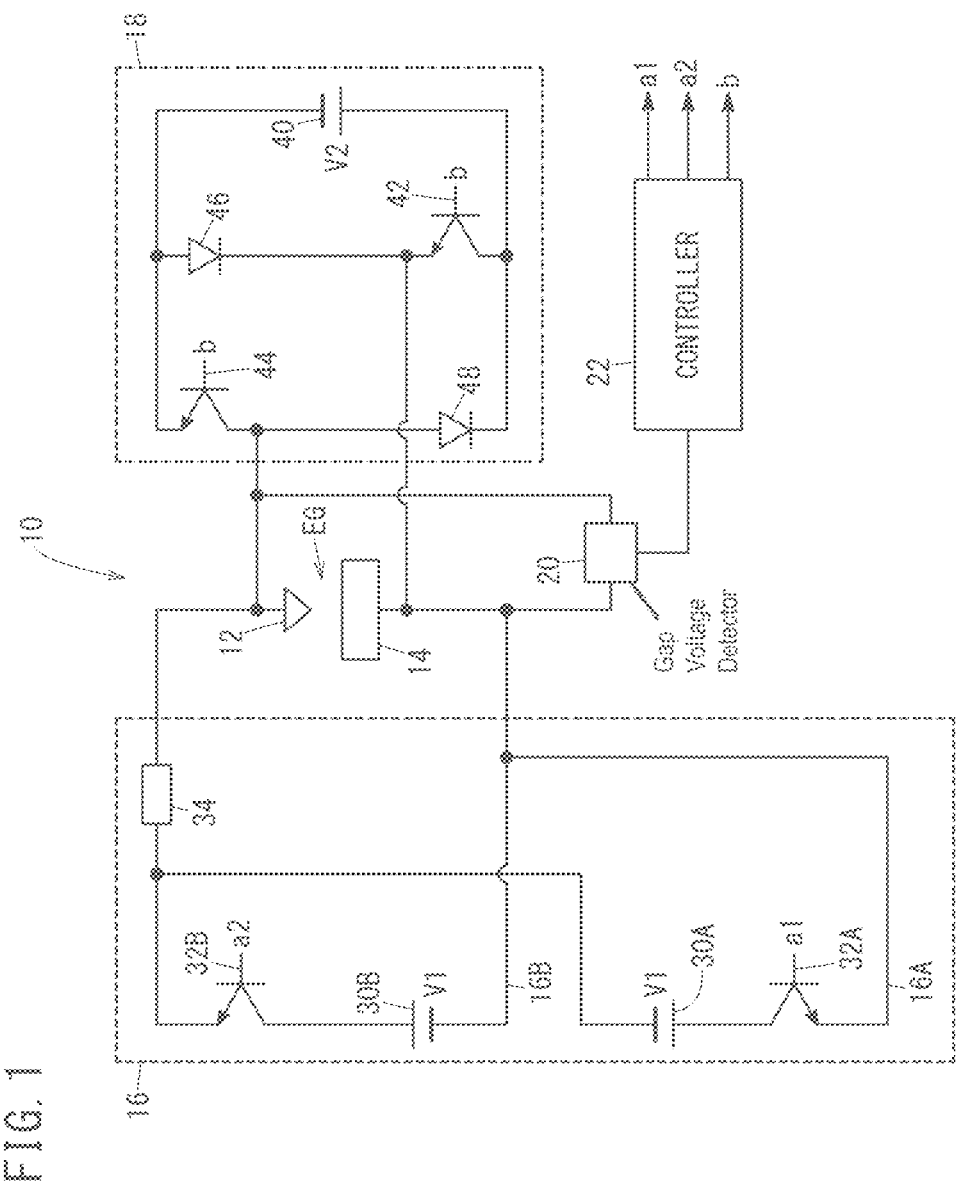
FIG. 1 is a diagram showing a schematic circuit configuration of a wire electrical discharge machine according to the present embodiment.

FIG. 1 is a diagram illustrating a schematic circuit configuration of a wire electrical discharge machine 10 according to the present embodiment. The wire electrical discharge machine 10 is an apparatus for machining a workpiece 14 by applying voltage across an electrode gap EG formed between a wire electrode 12 and the workpiece 14 to generate electrical discharge. The wire electrical discharge machine 10 sends out the wire electrode 12, changes the relative position of the wire electrode 12 to the workpiece 14 to machine the workpiece 14 into a desired shape. The wire electrical discharge machine 10 includes the wire electrode 12, a first power circuit 16, a second power circuit 18, a gap voltage detector 20, a controller 22 and the like.

The first power circuit 16 induces electric discharge by applying a first voltage V1 across the electrode gap EG. The first power circuit 16 includes a positive polarity circuit 16A that applies a first voltage V1 of positive polarity across the electrode gap EG by setting the wire electrode 12 negative and the workpiece 14 positive; a negative polarity circuit 16B that applies a first voltage V1 of negative polarity across the electrode gap EG by setting the wire electrode 12 positive and the workpiece 14 negative; and a current limiting circuit 34 and others. The positive polarity circuit 16A includes a first power supply 30A, a switching element 32A of a transistor and others. The negative polarity circuit 16B includes a first power supply 30B, a switching element 32B of a transistor and others.

The current limiting circuit 34 includes a capacitor, a diode and others, and is a circuit for preventing reverse current flow and the like.

In the positive polarity circuit 16A, the positive electrode side of the first power supply 30A is electrically connected to the workpiece 14 via the switching element 32A. The negative electrode side of the first power supply 30A is connected to the wire electrode 12 via the current limiting circuit 34. When the switching element 32A performs a switching operation in response to a control signal a1 from the controller 22, the first voltage V1 of positive polarity is applied from the first power supply 30A to the electrode gap EG.

The positive electrode side of the first power supply 30B in the negative polarity circuit 16B is connected to the wire electrode 12 via the switching element 32B and the current limiting circuit 34. The negative electrode side of the first power supply 30B is electrically connected to the workpiece 14. When the switching element 32B performs a switching operation in response to a control signal a2 from the controller 22, the first voltage V1 of negative polarity is applied from the first power supply 30B to the electrode gap EG.

The second power circuit 18 supplies a machining current (discharge current) by applying a second voltage V2 across the electrode gap EG. The second power circuit 18 includes a second power supply 40, switching elements 42 and 44 of transistors, diodes 46 and 48 and others.

In the second power circuit 18, the positive electrode side of the second power supply 40 is electrically connected to the workpiece 14 via the switching element 42. In the second power circuit 18, the negative electrode side of the second power supply 40 is connected to the wire electrode 12 via the switching element 44.

The switching elements 42 and 44 perform a switching operation in response to a control signal b from the controller 22. As a result, the second voltage V2 is applied from the second power supply 40 across the gap EG so that a machining current is supplied to the gap EG. The diodes 46 and 48 are diodes for preventing backflow of current and for regeneration.

The gap voltage detector 20 includes a voltmeter to detect the voltage V across the electrode gap EG.

The controller 22 controls the first power circuit 16 (specifically, 32A and 32B) to intermittently apply the first voltage V1 to the electrode gap EG. The controller 22 determines from the voltage V across the electrode gap EG acquired from the gap voltage detector 20 whether or not a discharge has occurred in the electrode gap EG during the application of the first voltage V1. If discharge is occurring, the controller 22 controls the second power circuit 18 (specifically, 42 and 44) to supply the machining current to the electrode gap EG.

Discharge resulting from the machining current causes electric charge to build up on the capacitor included in the current limiting circuit 34 described above. Then, when application of the first voltage V1 by the first power circuit 16 follows this discharge, the voltage is applied to the gap EG not only by the first power circuit 16 but also by the electric charge accumulated on the capacitor. As a result, the voltage V across the electrode gap EG becomes greater than the first voltage V1.

Here, it should be noted that as the distance between the wire electrode 12 and the workpiece 14 (also referred to as the spacing of the electrode gap EG) is wider, the voltage applied to the electrode gap EG per unit time becomes higher. Therefore, the controller 22 adjusts the spacing of the electrode gap EG based on the voltage applied to the electrode gap EG per unit time.

If an extra voltage is applied to the electrode gap EG by the capacitor, the voltage V per unit time of the electrode gap EG becomes greater than a desired voltage, and the controller 22 will estimate the distance between the wire electrode 12 and the workpiece 14 to be greater than the actual distance and shorten the distance between the wire electrode 12 and the workpiece 14 more than necessary. As a result, there is a possibility that appropriate machining cannot be performed.

In order to avoid the above-described phenomenon caused by the electric charge accumulated on the capacitor, the controller 22 is configured to prohibit the second power circuit 18 from supplying the machining current even though a discharge is induced by the next application of the first voltage V1 to the electrode gap EG from the first power circuit 16 after the supply of the machining current to the electrode gap EG from the second power circuit 18.

Figure 2:
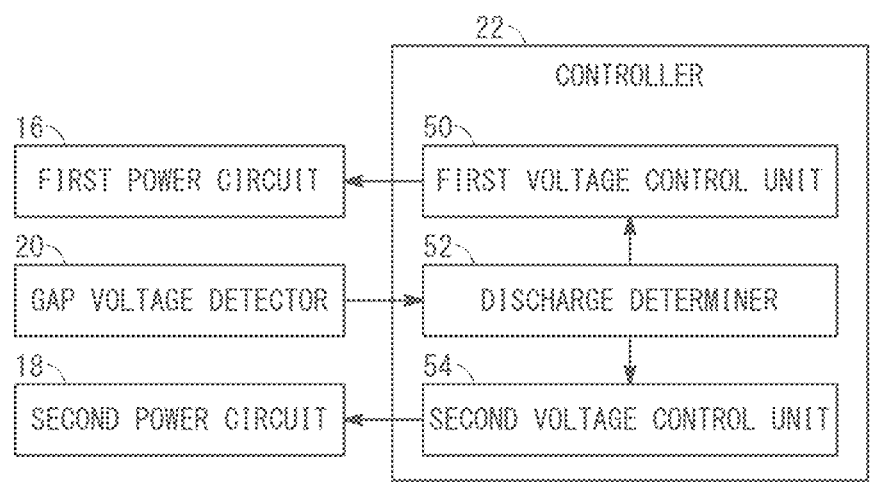
FIG. 2 is a diagram showing an example of functional blocks of a control device according to the present embodiment.

To achieve the above operation, the controller 22 includes, as shown in FIG. 2, a first voltage control unit 50, a discharge determiner 52 and a second voltage control unit 54. The first voltage control unit 50 controls the first power circuit 16 to intermittently apply the first voltage V1 to the electrode gap EG. Based on the information indicating the voltage V across the electrode gap EG acquired from the gap voltage detector 20, the discharge determiner 52 determines whether or not a discharge has started in the electrode gap EG during the application of the first voltage V1. To make a judgment, the discharge determiner 52 determines that a discharge has occurred in the electrode gap EG when the voltage V across the electrode gap EG becomes lower than a predetermined voltage (discharge determination voltage) V3 during the application of the first voltage V1 from the first power circuit 16. When a discharge has occurred in the electrode gap EG, the second voltage control unit 54 controls the second power circuit 18 to supply the machining current to the electrode gap EG. However, even if it has been determined that a discharge is induced in the electrode gap EG during the application of the first voltage V1 by the first power circuit 16 immediately after the supply of the machining current to the electrode gap EG, the second voltage control unit 54 prohibits the second power circuit 18 from applying the second voltage V2 to the electrode gap EG so as not to supply the machining current to the electrode gap EG.

The controller 22 includes, for example, a processor such as a CPU (Central Processing Unit) or an MPU (Micro Processing Unit), a memory such as a ROM (Read Only Memory) and a RAM (Random Access Memory), an input interface circuit, an output interface circuit and the like. The processor executes processing using programs and various information stored in the memory and outputs signals via the output interface circuit, thereby making it possible to realize the functions of the first voltage control unit 50 and the second voltage control unit 54. The function of the discharge determiner 52 can be realized by the processor as it executes processing based on the information acquired via the input interface circuit and the program and various information stored in the memory.

FIG. 3 is a flowchart illustrating the operation of applying voltage to the electrode gap EG in the wire electrical discharge machine 10 according to this embodiment. For ease of understanding, the polarity of the voltage applied to the electrode gap EG will not be particularly limited.

At step S1, in response to an instruction from the first voltage control unit 50, the first power circuit 16 applies a pulse of the first voltage V1 to the electrode gap EG. At step S2, the discharge determiner 52 determines whether or not a discharge has occurred in the electrode gap EG during application of the first voltage V1 at step S1, based on the voltage V across the electrode gap EG detected by the gap voltage detector 20.

When it is determined at step S2 that no electrical discharge has occurred, the processing of the wire electrical discharge machine 10 returns to step S1. When it is determined at step S2 that a discharge has occurred, the second voltage control unit 54 determines at step S3 whether or not a machining current has been supplied to the electrode gap EG from the second power circuit 18 after the previous application of a pulse of the first voltage V1.

When it is determined at step S3 that no machining current has been supplied, the second voltage control unit 54 controls the second power circuit 18 to apply the second voltage V2 to the electrode gap EG and supply the machining current at step S4. Subsequently, the processing of the wire electrical discharge machine 10 is returned to step S1.

When it is determined at step S3 that the machining current has been supplied, the second voltage control unit 54 controls the second power circuit 18 to prohibit application of the second voltage V2 to the electrode gap EG at step S5. Subsequently, the processing of the wire electrical discharge machine 10 is returned to step S1. Thus, no machining current is supplied to the electrode gap EG.

FIG. 4A is a timing chart showing an example of application timings of the first voltage V1 and the second voltage V2 applied to the electrode gap EG and the behavior of the voltage V across the electrode gap EG in the wire electrical discharge machine 10 according to the present embodiment. In the following, for ease of understanding, a case where a voltage of positive polarity is applied to the electrode gap EG will be described as an example.

At time t0, the control signal a1 output from the first voltage control unit 50 to the first power circuit 16 rises. While the control signal a1 is in the high state, the first power circuit 16 continues to apply the first voltage V1 to the electrode gap EG. By this application, the voltage V across the electrode gap EG gradually rises and exceeds a predetermined voltage (open determination voltage) V4, reaching the first voltage V1 when no short-circuit occurs.

During the application of the first voltage V1 to the electrode gap EG, in this example a discharge takes place in the electrode gap EG at time t1. Due to the occurrence of discharge, the voltage V across the electrode gap EG drops from the first voltage V1 to a voltage V lower than a predetermined voltage (discharge determination voltage) V3. As the gap voltage detector 20 detects a voltage V lower than the predetermined voltage V3 as the voltage V across the electrode gap EG, the discharge determiner 52 determines that discharge has occurred in the electrode gap EG from the detection result. Based on the determination result from the discharge determiner 52, the first voltage control unit 50 causes the control signal a1 to fall, which is output to the first power circuit 16.

Based on the determination result from the discharge determiner 52, the second voltage control unit 54 raises the control signal b (to be output to the second power circuit 18) at time t1 and continues to output the signal to the second power circuit 18 while keeping the control signal b in the high state until time t2. In response to the rise of the control signal b, the second power circuit 18 applies the second voltage V2 to the gap EG from time t1 to time t2. By applying the second voltage V2 to the electrode gap EG, the machining current continues to be supplied to the electrode gap EG from time t1 to time t2. Thus, the workpiece 14 is machined by this machining current.

As the control signal b output from the second voltage control unit 54 to the second power circuit 18 falls at time t2, the second power circuit 18 interrupts the application of the second voltage V2 to the electrode gap EG. Thereby, the discharge in the electrode gap EG converges, and the current through the electrode gap EG falls to zero. Note that electric charge builds up on the capacitor in the current limiting circuit 34 due to occurrence of discharge in the electrode gap EG.

After a pause time from time t2 to time t3 during which no voltage V is applied to the electrode gap EG, the first voltage control unit 50 raises the control signal a1 to be output to the first power circuit 16 at time t3. In response to the rising edge of the control signal a1, the first power circuit 16 applies the first voltage V1 to the electrode gap EG. When the first voltage V1 is applied, the electric charge accumulated on the capacitor in the current limiting circuit 34 is discharged, so that the voltage V across the gap EG becomes higher than the first voltage V1.

While the first voltage V1 is being applied to the electrode gap EG, in this example a discharge occurs in the electrode gap EG at time t4. As a result, the voltage V across the electrode gap EG drops to a voltage V lower than the predetermined voltage V3. At this time, the discharge determiner 52 determines from the voltage V detected by the gap voltage detector 20 that a discharge has occurred in the electrode gap EG. Based on the determination result from the discharge determiner 52, the first voltage control unit 50 causes the control signal a1 to fall, which is output to the first power circuit 16.

Here, in a conventional configuration, the machining current will be supplied to the electrode gap EG at time t4. However, the second voltage control unit 54 in this embodiment does not raise the control signal b at time t4, thereby prohibits the second power circuit 18 from applying the second voltage V2 to the electrode gap EG. Thus, the machining current is not supplied to the electrode gap EG from time t4 to time t5. Since the charge accumulated on the capacitor due to the discharge from time t1 to time t2 is discharged from time t3 to time t4 and no machining current is supplied to the electrode gap EG from time t4 to time t5, no charge is accumulated on the capacitor of the current limiting circuit 34. Therefore, at the time of the next application of the first voltage V1 at time t6, the voltage V across the electrode gap EG equals the first voltage V1. Therefore, it is possible to suppress undesired machining.

FIG. 4B is a timing chart showing another example of application timings of the first voltage V1 and the second voltage V2 applied to the electrode gap EG and the behavior of the voltage V across the electrode gap EG in the wire electrical discharge machine 10 according to the present embodiment. In the following, for ease of understanding, a case where a voltage of positive polarity is applied to the electrode gap EG will be described as an example.

In the case of FIG. 4B, the application timings of the voltage V from the first power circuit 16 and the second power circuit 18 to the electrode gap EG are the same as those shown in FIG. 4A, and the operation and the behavior of the voltage V across the electrode gap EG up to time t3 in the wire electrical discharge machine 10 are the same as those shown in FIG. 4A, so the following description will be given focusing on points of difference.

Here, a case will be considered in which, at time t3, a short-circuit is occurring in the electrode gap EG due to the contact between the wire electrode 12 and the workpiece 14, or the presence of cut debris in the electrode gap EG. In this case, in principle, the voltage V across the electrode gap EG will not rise up to the predetermined voltage (open determination voltage) V4 or the first voltage V1 even when the first voltage V1 is applied to the gap EG from the first power circuit 16 at time t3, hence it will be determined that a short-circuit is occurring. Nevertheless, there may occur an incident that in spite of the occurrence of a short-circuit, the voltage V across the electrode gap EG reaches the predetermined voltage (open determination voltage) V4 or the first voltage V1, due to the influence of the electric charge that has been accumulated on the capacitor of the current limiting circuit 34 during the discharge in the electrode gap EG between time t1 and time t2. As a result, the controller 22 may determine that no short circuit is occurring in the electrode gap EG.

Therefore, if a discharge occurs at time t4, in a conventional configuration, the second voltage V2 is undesirably applied from the second power circuit 18 to the electrode gap EG. However, the second voltage control unit 54 in the present embodiment will not raise the control signal b at time t4 based on the fact that the machining current has been supplied to the electrode gap EG after the previous pulse application of the first voltage V1, thereby prohibits the second power circuit 18 from applying the second voltage V2 to the electrode gap EG. Thus, similarly to the case shown in FIG. 4A, the machining current is not supplied to the electrode gap EG from time t4 to time t5. Therefore, it is possible to suppress execution of undesired machining when a short-circuit occurs.

According to the wire electrical discharge machine 10 according to the present embodiment, even if an electrical discharge occurs during the application of a pulse of the first voltage V1 after a supply of the machining current to the electrode gap EG, no machining current is supplied to the electrode gap EG. As a result, it is possible to prevent failure to perform desired machining due to fluctuation of the voltage across the electrode gap EG caused by the capacitor.

Inventions Obtained from the Embodiment

The inventions that can be grasped from the above embodiment will be described below.

<First Aspect of Invention>

The wire electrical discharge machine (10) which performs electrical discharge machining on the workpiece (14) by using electrical discharges generated by applying the voltage (V1, V2) across the electrode gap (EG) formed between the wire electrode (12) and the workpiece (14), includes: the first power circuit (16) including the capacitor and configured to induce an electrical discharge by applying the first voltage (V1) across the electrode gap (EG); the second power circuit (18) configured to supply a machining current through the electrode gap (EG) by applying the second voltage (V2) across the electrode gap (EG); the gap voltage detector (20) configured to detect the voltage (V) across the electrode gap (EG); the first voltage control unit (50) configured to apply the first voltage (V1) to the electrode gap (EG) in an intermittent manner by controlling the first power circuit (16); the discharge determiner (52) configured to determine whether or not the electrode gap (EG) is in a discharging state during application of the first voltage (V1), based on the detected voltage (V) across the electrode gap (EG); and the second voltage control unit (54) configured to supply the machining current through the electrode gap (EG) by controlling the second power circuit (18) when the electrode gap (EG) is determined to be in a discharging state, wherein after a supply of the machining current to the electrode gap (EG), even when a discharge is induced during the next application of the first voltage (V1) to the electrode gap (EG), the second voltage control unit (54) prohibits the second power circuit (18) from applying the second voltage (V2) to the electrode gap (EG) so as not to supply the machining current through the electrode gap (EG).

This configuration makes it possible to prevent failure to perform proper machining due to fluctuation of the voltage (V) across the electrode gap (EG) caused by the capacitor.

When the voltage (V) across the electrode gap (EG) becomes lower than the predetermined voltage (V3) during the application of the first voltage (V1), the discharge determiner (52) in the wire electrical discharge machine (10) may determine that the electrode gap (EG) is in a discharging state. Thereby, it is possible to judge occurrence of a discharge in a more accurate manner.

<Second Aspect of Invention>

In the electrical discharging method for performing electrical discharge machining on the workpiece (14) with the wire electrical discharge machine (10) by using electrical discharges generated by applying the voltage (V1, V2) across the electrode gap (EG) formed between a wire electrode (12) and the workpiece (14), wherein the wire electrical discharge machine (10) includes: the first power circuit (16) including the capacitor and applying the first voltage (V1) across the electrode gap (EG) to induce an electrical discharge; the second power circuit (18) applying the second voltage (V2) across the electrode gap (EG) to supply a machining current through the electrode gap (EG); and the gap voltage detector (20) detecting the voltage (V) across the electrode gap (EG), the electrical discharging method including: a first voltage control step of applying the first voltage (V1) to the electrode gap (EG) in an intermittent manner by controlling the first power circuit (16); a discharge determination step of determining whether or not the electrode gap (EG) is in a discharging state during application of the first voltage (V1), based on the detected voltage (V) across the electrode gap (EG); and a second voltage control step of supplying the machining current through the electrode gap (EG) by controlling the second power circuit (18) when the electrode gap (EG) is determined to be in a discharging state, wherein after a supply of the machining current to the electrode gap (EG), even when a discharge is induced during the next application of the first voltage (V1) to the electrode gap (EG), the second power circuit (18) is prohibited from applying the second voltage (V2) to the electrode gap (EG) in the second voltage control step so as not to supply the machining current through the electrode gap (EG).

This configuration makes it possible to prevent failure to perform proper machining due to fluctuation of the voltage (V) across the electrode gap (EG) caused by the capacitor.

In the discharge determination step, when the voltage (V) across the electrode gap (EG) becomes lower than the predetermined voltage (V3) during the application of the first voltage (V1), it may be determined that the electrode gap (EG) is in a discharging state. Thereby, it is possible to judge occurrence of a discharge in a more accurate manner.

The present invention is not limited to the embodiments described above, and it goes without saying that the embodiments can be freely modified within a range that does not deviate from the essence and gist of the present invention as set forth in the appended claims.

What is claimed is:

1. A wire electrical discharge machine which performs electrical discharge machining on a workpiece by using electrical discharges generated by applying voltage across an electrode gap formed between a wire electrode and the workpiece, comprising:
    a first power circuit including a capacitor and configured to induce an electrical discharge by applying a first voltage across the electrode gap;
    a second power circuit configured to supply a machining current through the electrode gap by applying a second voltage across the electrode gap;
    a gap voltage detector configured to detect the voltage across the electrode gap;
    a first voltage control unit operatively coupled to the first power circuit, the first voltage control unit programmed to apply the first voltage to the electrode gap in an intermittent manner by controlling the first power circuit;
    a discharge determiner configured to determine whether or not the electrode gap is in a discharging state during application of the first voltage, based on the detected voltage across the electrode gap; and
    a second voltage control unit operatively coupled to the second power circuit, the second voltage control unit programmed to supply the machining current through the electrode gap when the electrode gap is determined to be in a discharging state unless machining current was supplied after the previous discharging state,
    then the second voltage control unit is programmed to not supply the machining current through the electrode gap, wherein the first voltage control unit is programmed to apply the first voltage to the electrode gap where the electrode gap gets into the discharging state during subsequent application of the first voltage after the machining current was not supplied through the electrode gap previously, the second voltage control unit is programmed to supply the machining current through the electrode gap.

2. The wire electrical discharge machine according to claim 1, wherein when the voltage across the electrode gap becomes lower than a predetermined voltage during the application of the first voltage, the discharge determiner determines that the electrode gap is in a discharging state.

3. An electrical discharging method for performing electrical discharge machining on a workpiece with a wire electrical discharge machine by using electrical discharges generated by applying voltage across an electrode gap formed between a wire electrode and the workpiece, wherein the wire electrical discharge machine includes: a first power circuit including a capacitor and applying a first voltage across the electrode gap to induce an electrical discharge; a second power circuit applying a second voltage across the electrode gap to supply a machining current through the electrode gap; and a gap voltage detector detecting the voltage across the electrode gap,
    the electrical discharging method comprising:
    a first voltage control step of applying the first voltage to the electrode gap in an intermittent manner by controlling the first power circuit;
    a discharge determination step of determining whether or not the electrode gap is in a discharging state during application of the first voltage, based on the detected voltage across the electrode gap; and
    a second voltage control step of supplying the machining current through the electrode gap by controlling the second power circuit when the electrode gap is determined to be in a discharging state,
    wherein after a supply of the machining current to the electrode gap, even when a discharge is induced during next application of the first voltage to the electrode gap, the second power circuit is prohibited from applying the second voltage to the electrode gap in the second voltage control step so as not to supply the machining current through the electrode gap,
    where the electrode gap gets into the discharging state during further application of the first voltage after the machining current has not been supplied through the electrode gap last time, the machining current is supplied through the electrode gap.

4. The electrical discharge machining method according to claim 3, wherein in the discharge determination step, when the voltage across the electrode gap becomes lower than a predetermined voltage during the application of the first voltage, it is determined that the electrode gap is in a discharging state.

* * * * *